(12) United States Patent
Ishibashi et al.

(10) Patent No.: US 12,502,550 B2
(45) Date of Patent: Dec. 23, 2025

(54) LIGHT BEAM IRRADIATION APPARATUS

(71) Applicant: Teijin Pharma Limited, Tokyo (JP)

(72) Inventors: Naoya Ishibashi, Tokyo (JP); Yuki Kawase, Tokyo (JP); Takuya Nanjo, Tokyo (JP)

(73) Assignee: Teijin Pharma Limited, Tokyo (JP)

( * ) Notice: Subject to any disclaimer, the term of this patent is extended or adjusted under 35 U.S.C. 154(b) by 412 days.

(21) Appl. No.: 18/017,256

(22) PCT Filed: Jul. 20, 2021

(86) PCT No.: PCT/JP2021/027081
§ 371 (c)(1),
(2) Date: Jan. 20, 2023

(87) PCT Pub. No.: WO2022/019293
PCT Pub. Date: Jan. 27, 2022

(65) Prior Publication Data
US 2023/0285770 A1  Sep. 14, 2023

(30) Foreign Application Priority Data

Jul. 21, 2020  (JP) ................................. 2020-124370
Dec. 22, 2020  (JP) ................................. 2020-212321

(51) Int. Cl.
*A61N 5/06* (2006.01)
*A61B 18/00* (2006.01)

(52) U.S. Cl.
CPC .. *A61N 5/0613* (2013.01); *A61B 2018/00494* (2013.01); *A61B 2018/00702* (2013.01); *A61N 2005/0644* (2013.01)

(58) Field of Classification Search
CPC .......... A61N 5/0613; A61N 2005/0644; A61N 2005/0643; A61N 5/0619; A61N 2005/007; A61N 2005/0659; A61B 2018/00494; A61B 2018/00702; A61B 18/20–18/28
See application file for complete search history.

(56) References Cited

U.S. PATENT DOCUMENTS

| 11,160,980 B2 * | 11/2021 | Mishra ............... A61N 1/36071 |
| 2015/0238772 A1 | 8/2015 | Meyer et al. |
| 2016/0228724 A1 * | 8/2016 | Johansson ............ A61N 5/0613 |

(Continued)

FOREIGN PATENT DOCUMENTS

| EP | 1 913 972 A1 | 4/2008 |
| JP | 2012-514498 A | 6/2012 |

OTHER PUBLICATIONS

International Search Report for PCT/JP2021/027081 dated Sep. 7, 2021.

(Continued)

*Primary Examiner* — Jonathan T Kuo
(74) *Attorney, Agent, or Firm* — Sughrue Mion, PLLC (57) ABSTRACT

An object of the present invention is to provide a new indication for phototherapy or prevention, and to provide a new treatment or prevention device for irritable bowel syndrome. The present invention is a device for treating or preventing irritable bowel syndrome, specifically a light beam irradiation device for treating or preventing irritable bowel syndrome by performing percutaneous irradiation toward the sacral foramina on one side or both sides and the vicinity thereof.

16 Claims, 4 Drawing Sheets

(56) References Cited

U.S. PATENT DOCUMENTS

| | | |
|---|---|---|
| 2018/0228689 A1 | 8/2018 | Lach et al. |
| 2018/0256906 A1 | 9/2018 | Pivonka et al. |
| 2018/0369602 A1 | 12/2018 | Tichauer |
| 2019/0374776 A1* | 12/2019 | Mishra ................. A61N 1/3752 |
| 2020/0086134 A1 | 3/2020 | Johnson et al. |

OTHER PUBLICATIONS

Extended European Search Report issued Nov. 23, 2023 in European Application No. 21845900.6.
"Irribow Tablets 2.5 μg/Irribow Tablets 5 μg", Treatment for diarrhea-predominant irritable bowel syndrome, Ramosetron hydrochloride tablets, Mar. 2021 (5 pages total).
International Preliminary Report on Patentability with the translation of Written Opinion dated Jan. 24, 2023 from the International Bureau in International Application No. PCT/JP2021/027081.

* cited by examiner

LIGHT BEAM IRRADIATION APPARATUS

This Application is a National Stage of International Application No. PCT/JP2021/027081 filed Jul. 20, 2021, claiming priority based on Japan Patent Application No. 2020-124370 filed Jul. 21, 2020 and Japan Patent Application No. 2020-212321 filed Dec. 22, 2020.

TECHNICAL FIELD

The present invention relates to a light beam irradiation device.

BACKGROUND ART

Light beam irradiation devices that apply, for example, infrared rays (wavelengths of approximately 700 nm to 2500 nm) as treatment light targeted at an affected area or an acupressure point through the skin have been used for treatment or prevention such as relief of aching pain. It has recently been revealed that irradiation of light has various actions on nerves, such as selective suppression of nerve conduction in sensory fibers that transmit pain in peripheral nervous systems, suppression of pain-producing substances, and tension relaxation of sympathetic nerves. Among the light beams, the laser light beams are widely used in these applications since the laser light beams can be emitted at a specific wavelength with high power.

For example, PTL 1 describes treatment of dysuria, in which dysuria is treated by applying laser light percutaneously, targeted at the sacral foramina where bladder sensory nerves exist, in order to suppress abnormal activities of sensory nerves in the bladder. In such a treatment, repeatedly irradiating a given site such as an affected area and an acupressure point is an important factor for achieving the maximum effect. In addition, since the treatment requires repetition of the light irradiation for several minutes to several tens of minutes a day at a frequency of from twice a week to everyday, the light irradiation is desirably performed by the patient himself/herself at home. Further, PTL 2 reports that a chair-type phototherapy device allows the treatment easily performed while sitting by irradiating with a light beam the sacral foramina that cannot be directly seen.

Irritable bowel syndrome is, though not a life-threatening disease to a patient, is characterized by chronic abdominal pain and abnormal bowel movements, and thus has a great impact on the patient's daily life and significantly impairs the quality of life of the patient. The irritable bowel syndrome is widely treated with medical therapy, and a therapeutic agent for diarrhea-predominant irritable bowel syndrome, ramosetron hydrochloride, is described in PTL 3, which therapeutic effect is shown in the attached document of NPL 1. The responder rate showing effectiveness is only 46.9% in men, and there are about half of the patients who do not obtain the therapeutic effect. When drugs indicated for irritable bowel syndrome are not effective, drugs not indicated for the syndrome or psychotherapy such as cognitive-behavioral therapy are used, but the therapeutic or preventive effect is not sufficient at present. From the above background, a new treatment method or prevention method suitable for irritable bowel syndrome is expected. In addition, there is no report that light beam irradiation can be applicable for the treatment or prevention of irritable bowel syndrome.

CITATION LIST

Patent Literature

[PTL 1] Japanese Unexamined Patent Application Publication No. 2009-172068

[PTL 2] International Publication 2020/004516

[Patent Document 3] Japanese Patent No. 3763360

Non Patent Literature

[NPL 1] Attached document of Irribow Tablets 2.5 μg/Irribow Tablets 5 μg

SUMMARY OF INVENTION

Technical Problem

The present invention provides new indications for phototherapy or prevention, and an object of the present invention is to provide a new treatment or prevention device for irritable bowel syndrome. Light beam irradiation is a non-invasive and safe method of treatment or prevention, and allows performing treatment or prevention either at medical institutions such as hospitals or at home, and thus is a treatment or prevention method suitable for treating or preventing chronic diseases such as irritable bowel syndrome.

Solution to Problem

The present invention is a device for treating or preventing irritable bowel syndrome, specifically a light beam irradiation device for treating or preventing irritable bowel syndrome by performing percutaneous irradiation toward the sacral foramina on one side or both sides and the vicinity thereof.

That is, the present invention is as follows.

(1) A light beam irradiation device used for treating or preventing irritable bowel syndrome, comprising: a light beam source emitting a light beam and a light beam irradiation probe performing irradiation with the light beam, light beam irradiation being performed percutaneously with the light beam emitted by the light beam source from the light beam irradiation probe toward sacral foramina on one side or both sides and a vicinity thereof (2) The light beam irradiation device according to (1), wherein an average power of the light beam of irradiation from the light beam irradiation probe is 200 mW or more.

(3) The light beam irradiation device according to (1) or (2), wherein the average power (average power of light beam of irradiation from the light beam irradiation probe/irradiation area of light beam) is 200 mW to 19 W.

(4) The light beam irradiation device according to any one of (1) to (3), wherein an average power density (average power of light beam of irradiation from the light beam irradiation probe/irradiation area of light beam) is 75 mW/cm$^2$ or more.

(5) The light beam irradiation device according to any one of (1) to (4), wherein the average power density of the light beam of irradiation from the light beam irradiation probe is 75 to 6600 mW/cm$^2$.

(6) The light beam irradiation device according to any one of (1) to (5), wherein an amount of the light beam of irradiation from the light beam irradiation probe in terms of energy is 130 J or more per treatment.

(7) The light beam irradiation device according to any one of (1) to (6), wherein the amount of the light beam of irradiation from the light beam irradiation probe in terms of energy is 130 to 11020 J per treatment.

(8) The light beam irradiation device according to any one of (1) to (7), wherein an energy density (amount of light beam of irradiation from the light beam irradiation probe in terms of energy/irradiation area of light beam) is 45 J/cm$^2$ or more per treatment.
(9) The light beam irradiation device according to any one of (1) to (8), wherein the energy density (amount of light beam of irradiation from the light beam irradiation probe in terms of energy/irradiation area of light beam) is 45 to 4000 J/cm$^2$ per treatment.
(10) The light beam irradiation device according to any one of (1) to (9), wherein a wavelength of the light beam of irradiation from the light beam irradiation probe is 750 to 850 nm.
(11) The light beam irradiation device according to any one of (1) to (10), wherein the device integrates the light beam source into the light beam irradiation probe and is portable.

Advantageous Effects of Invention

According to the present configuration, irritable bowel syndrome can be treated or prevented by performing percutaneous irradiation toward the sacral foramina on one side or both sides and the vicinity thereof. Further, by using the light beam irradiation device of the present invention, or by using the light beam of irradiation performed by the light beam irradiation device in the present invention, there can be provided a treatment or prevention method for irritable bowel syndrome.

DESCRIPTION OF EMBODIMENTS

Figure 1:
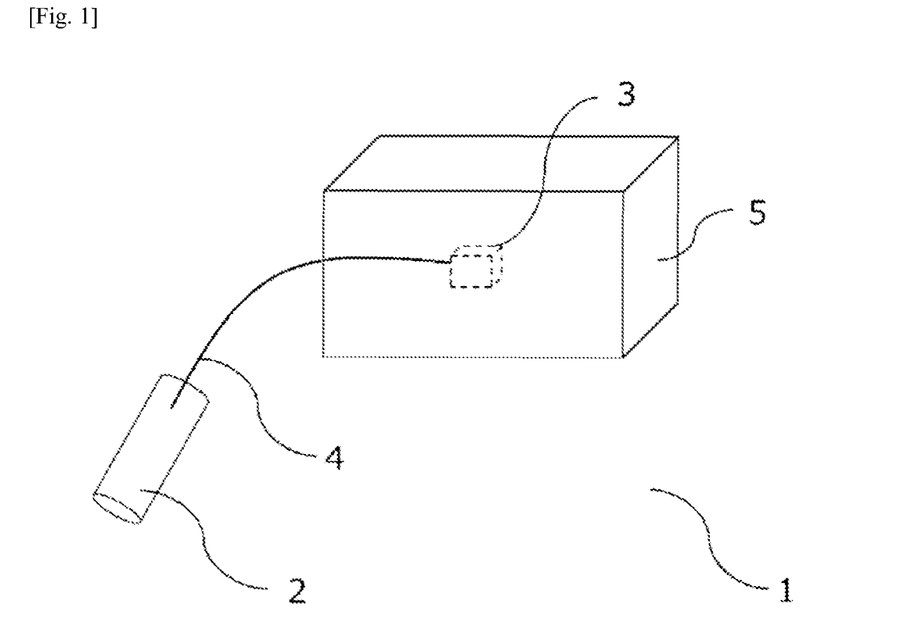
FIG. 1 shows an embodiment of the present light beam irradiation device.

Hereinafter, embodiments for carrying out the present invention will be described in detail with reference to the drawings. In the description of the drawings, the same elements are designated by the same reference signs, and duplicate description will be omitted.
(Light Beam Irradiation Device According to the First Embodiment)
The light beam irradiation device 1 according to the first embodiment of the present invention will be described with reference to the drawings. As shown in FIG. 1, the light beam irradiation device 1 of the present embodiment is a medical device for treating or preventing irritable bowel syndrome by performing percutaneous irradiation toward the sacral foramina of a patient on one side or both sides and the vicinity thereof. The light beam irradiation device is equipped with a light beam irradiation probe 2 for irradiation of a light beam, a light beam source 3, a probe cable 4 for connecting the light beam source and the light beam irradiation probe, and a main body 5 having the light beam source built-in.

Figure 2:
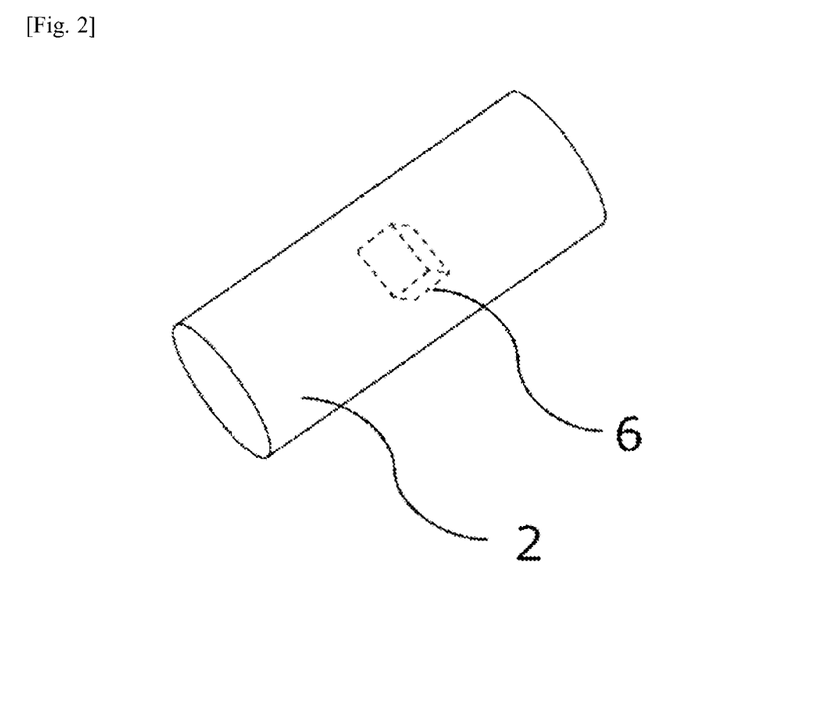
FIG. 2 shows another embodiment of the present light beam irradiation device.

The patient performs treatment or prevention by putting the light beam irradiation probe 2 on the skin just above the sacral foramina and performing irradiation with a light beam. FIG. 1 shows a situation in which a light beam is guided by a probe cable 4, and the main body is provided with a power supply (not shown). As shown in FIG. 2, there can be adopted a configuration in which the light beam irradiation probe 2 has a light beam source and a power supply 6 built-in, which allows the patient to carry the device around and thus to perform treatment or prevention even when going out. Concerning this syndrome, many of the patients are not hospitalized and have their daily lives like healthy people, and thus a portable treatment or prevention device that is available when needed is convenient.

The light beam irradiation probe 2 may be held by hand and put on the skin above the sacrum to perform irradiation with a light beam, or may be fixed or stuck to the skin with a fixing tool such as a belt (not shown), or a sticking tool such as a suction cup and a tape to perform irradiation. In order to facilitate putting the light beam irradiation probe on the irradiation site of the patient, the skin just above the sacral foramina, the light beam irradiation probe may be attached as chair-type or bed-type.

Since the irradiation site of the present invention of sacral foramina and the skin in the vicinity thereof is located on the back, there is preferably provided a mechanism, for efficient treatment or prevention, of attaching an imaging unit for imaging the irradiation site with an instrument such as a camera to the light beam irradiation probe to allow the patient to irradiate the skin directly above the sacral foramina while visually observing it through a monitor or the like.

In order to enhance the safety for irradiation with a light beam, there is preferably provided a structure which prevents the diffuse reflected light from the skin which is irradiated by the light beam from leaking outside when the tip of the light beam irradiation probe comes into contact with the skin. There is more preferably provided a structure in which a sensor for detection of contact with the skin and a control calculation unit are equipped at the tip and vicinity of the light beam irradiation probe to enable irradiation only when the light beam irradiation probe is correctly in contact with the skin of the irradiation site.

As a side effect of the light beam, there is a burn caused by an increase in the temperature of the skin. The burn can be prevented by a method in which an increase in the skin temperature is reduced by a pulse irradiation of irradiating with a light beam intermittently while maintaining energy that is the amount of light beam and the energy density. In that case, the repetition frequency is preferably 0.5 to 10 Hz. Further, there is preferably provided a structure in which the temperature is lowered by forced convection using a fan, a compressor or the like as an air blowing source to blow air to the skin through a flow path or the like.
(Light Beam Irradiation Site)
The irradiation site of the light beam in the present invention is in the vicinity of the sacral foramina on both sides or one side. Irradiation is preferably performed toward the sacral nerve root from any one or some of the sacral foramina of S2, S3 and S4. The method of irradiating with the light beam is in principle percutaneous irradiation. In that case, the surface area of the irradiation site is about 0.5 to about 6 cm$^2$, preferably 0.6 to 3 cm$^2$, and the shape is preferably circular, elliptical, rectangular, or the like. The size of the sacral foramina is about 1 cm$^2$, and the target can be efficiently irradiated due to transmission of laser light through a bone part and scattering of laser light in a living body.

(Light Beam for Irradiation)

The light beam irradiation device of the present invention preferably has any one or a plurality of the following light beam conditions in order to exhibit a therapeutic effect on irritable bowel syndrome. That is, the conditions are as follows: the average power is 200 mW or more, the average power density (average power/irradiation area of light beam) is 75 mW/cm$^2$ or more, the amount of light beam in terms of energy is 130 J or more per treatment, and the energy density (amount of light beam in terms of energy/irradiation area of light beam) is 45 J/cm$^2$ or more per treatment or prevention, and the wavelength is 750 to 850 nm. Among these conditions, the average power, average power density, energy, and energy density are obtained by converting the conditions of the light beam in the test performed by using the irritable bowel syndrome model rat to the assumed-clinical conditions based on the light transmissiveness obtained by simulation. Further, the light beam for irradiation may be a single irradiation by continuous irradiation or an intermittent irradiation of repeated irradiation and pause.

The light beam irradiation device of the present invention may be set to perform irradiation under the preferable light beam conditions in the treatment or prevention of irritable bowel syndrome, or the light beam irradiation device is provided with a light beam source capable of performing irradiation under the preferable light beam conditions.

As a light beam which satisfies various irradiation conditions of the present invention such as average power, average power density, energy, energy density, and wavelength, there is a laser light beam which is excited by a semiconductor device and the like. An LED light beam satisfying the various conditions of the present invention may also be used. As reported in Photochemical & Photobiological Sciences 2018; 17(8): 1003-1017, LED light beams as well as laser light beams are widely used as light beams used for treatment or prevention.

(Average Power Range)

As shown in the Journal of clinical laser medicine & surgery, 1991; 9(4): 267-75, the relationship between the amount of light beam and the effect is explained by Arndt-Schuwltz law. Arndt-Schuwltz law explains that when the amount of light beam exceeds a certain threshold value, the biological activity is facilitated, and when the amount of light beam is further increased, the biological activity is suppressed. The conditions indicating the amount of light beam in the present invention are peak power, average power, average power density, energy, and energy density. Therefore, in each condition, when the value representing the condition is larger than the lower limit value confirmed to exhibit the effect, presumably there exists a similar neurotransmission inhibitory effect.

As described below by Examples, the conditions related to the amount of light beam on the rat such as peak power, average power, average power density, energy, and energy density can be converted to human equivalent conditions for each condition parameter by multiplying by 15.3. Therefore, the average power in the present invention is 0.2 W (200 mW) or more, preferably 0.2 W (200 mW) to 19 W, more preferably 0.2 W (200 mW) to 16 W, more preferably 0.2 W (200 mW) to 8.4 W, more preferably 0.2 W (200 mW) to 7.5 W, and even more preferably 0.2 W (200 mW) to 1.1 W.

(Range of Average Power Density)

The average power density (average power per unit area) in the present invention is 75 mW/cm$^2$ or more, more preferably 75 to 6600 mW/cm$^2$, more preferably 75 to 5400 mW/cm$^2$, more preferably 75 to 2600 mW/cm$^2$, more preferably 75 to 390 mW/cm$^2$, and even more preferably 75 to 400 mW/cm$^2$. Further, the lower limit value for each case is also preferably set to 90 mW/cm$^2$ or more.

(Energy Range)

The amount of light beam in terms of energy in the present invention is 130 J or more per treatment, preferably 130 to 11020 J, more preferably 130 to 9300 J, more preferably 130 to 5070 J, more preferably 130 to 4400 J, and even more preferably 130 to 650 J. Further, the lower limit value for each case is also preferably set to 160 J or more.

(Range of Energy Density)

The amount of light beam in terms of energy density in the present invention is 45 J/cm$^2$ or more per treatment, preferably 45 to 4000 J/cm$^2$, more preferably 45 to 3400 J/cm$^2$, more preferably 45 to 1820 J/cm$^2$, more preferably 45 to 1600 J/cm$^2$, and even more preferably 45 to 240 J/cm$^2$. Further, the lower limit value for each case is also preferably set to 51 J/cm$^2$ or more.

(Wavelength Range)

The wavelength of 808 nm used in the effectiveness test of the examples is included in the near infrared region of 750 to 850 nm. As shown in Journal of Physics D: Applied Physics, 2005, 38, 2543-2555, the transmissiveness to the living body is the same in the near infrared region, and thus the same effectiveness exists in the range of 750 to 850 nm.

Further, the absorption spectrum of cytochrome C oxidase, which has been reported to be involved in the mechanism of action in phototherapy, is reported to be the same in the range of 780 to 850 nm as shown in Journal of Biological Chemistry, 2005; 280(6): 4761-4771.

From the above, the wavelength in the present invention is preferably 750 to 850 nm, more preferably 780 to 850 nm, and even more preferably 788 to 828 nm.

(Irradiation Embodiment)

As an embodiment, treatment or prevention is preferably performed at a frequency of about twice a day to once a week. It can also be performed depending on the physical condition such as when the symptom develops or when it is likely to develop. The treatment time in terms of the duration of light beam irradiation is preferably about 3 to 60 minutes. In this case, a long continuous laser beam irradiation may cause a burn on the skin. A high-output irradiation can be performed by repeating intermittent irradiation such as 1-minute irradiation and 10-second pause, or 30-second irradiation and 5-second pause.

EXAMPLES

Example 1

Examination of Light Beam Transmissiveness by Simulation

The effectiveness of phototherapy depends on the amount of light at the target tissue. On the other hand, once a light beam irradiates a living body, it is repeatedly scattered and absorbed, and the amount of light decreases exponentially depending on the distance from the skin surface (Lambert-Beer law); thus, the effectiveness in deep tissues needs to be estimated considering the transmission of light beam. Compared with a clinical case, since small animals such as rats used non-clinically have a small body, for example, the distance to the sacral nerve is about half that of humans. For example, the distance from human skin to the sacral nerve existing in the S3 sacral foramen is 22 mm on average for the results of 11 subjects, while the distance from rat skin to the L6 and S1 nerves corresponding to the human S3 sacral nerve was 11.8 mm on average for the results of 5 rat cases. Although the structure of skin differs between rodents such as rats and humans, the constituents are the same, and thus the light transmissiveness can be said to depend greatly on the distance from the skin surface to the target tissue rather than on the difference of the animal species. Based on the above, when the conditions of the amount of light used clinically for humans are applied to small animals such as rats used in a nonclinical test, the applied amount of light makes a larger impact on tissues such as nerves in rats compared with that in humans, which makes it difficult to predict clinical results from a nonclinical test.

Therefore, we attempted to convert the experimental conditions of the nonclinical tests to those equivalent to the clinical tests by examining the transmitted amount of the light using light scattering simulation by Monte Carlo Modeling of Light Transport in Multi-layered Tissues in terms of Monte Carlo method (hereinafter referred to as MCML) (Computer Methods and Programs in Biomedicine, Volume 47, Issue 2, July 1995, Pages 131-146). Specifically, for the purpose of determining clinical equivalent conditions from the nonclinical test conditions related to the amount of light, such as peak power, average power, average power density, energy, and energy density, the transmissiveness was examined using MCML.

The conditions and results of MCML will be explained. A three-layer structure consisting of a skin layer, a fat layer, and a muscle layer was modeled, and the optical characteristics of each were set as follows. Note that the values are for skin, fat, and muscle, respectively (Phys. Med. Biol. 44 (1999) 2689-2702, J. Biomed. Opt. (2008) January-February 13(1): 014-015).

Refractive index n: 1.4 for all
Absorption coefficient $\mu a$: 0.15 $cm^{-1}$, 0.02 $cm^{-1}$, 0.3 $cm^{-1}$
Scattering coefficient $\mu s$: 100 $cm^{-1}$, 80 $cm^{-1}$, 33 $cm^{-1}$
Isotropic scattering parameter g: 0.85 for all
Thickness: 0.1 cm, 0.4 cm, 2.0 cm Under the muscle layer, it is assumed that a layer having a refractive index of 1.4 continues infinitely. The light irradiation conditions were assumed as follows: beam profile of Gaussian spatial intensity distribution, irradiation radius of 0.9 cm, and energy of 600 J. The number of photons was assumed to be 10 million, and the calculation was performed with a unit of 0.05 cm both in the depth direction and the radial direction.

Figure 3:
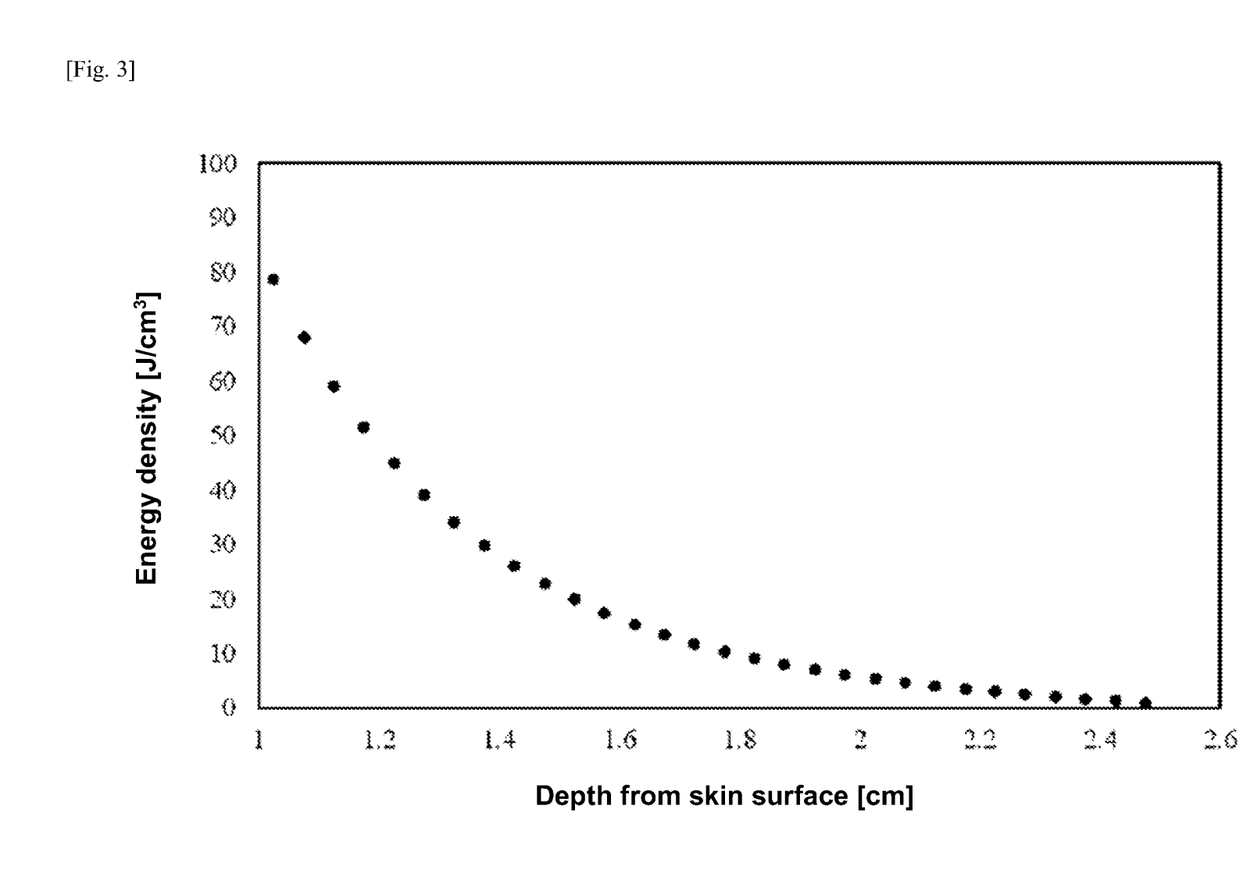
FIG. 3 is a graph showing an examination result of light transmissiveness using a light scattering simulation by MCML.

The results will be explained. FIG. 3 shows the relationship between the energy density and the depth within a radius of 0.025 cm near the center of the light irradiation site. The energy density was 51.7 $J/cm^3$ at a depth of 11.75 mm corresponding to the depth of rat L6 and S1 nerve, and the energy was 3.37 $J/cm^3$ at a depth of 21.75 mm corresponding to the depth of human S3 sacral foramen. Therefore, reproduction of the energy density corresponding to the depth of rat L6 and S1 nerve at the depth of human S3 sacral foramen requires the conditions related to the amount of light beam in the rat such as peak power, average power, average power density, energy, and energy density to be multiplied by 15.3 (the energy density at the depth of rat nerve/the energy density at the depth of human sacral foramen).

In the following, a test using an irritable bowel syndrome model rat for effectiveness examination will be described, wherein the test conditions of peak power, average power, average power density, energy, and energy density are assumed to be converted from the irradiation conditions for rats to the irradiation conditions for humans by multiplying by 15.3.

Example 2

Examination of Therapeutic Effect on Irritable Bowel Syndrome Model Rat by Light Beam Irradiation Physical restraint stress model rats, one of the animal models of irritable bowel syndrome, were used and the effectiveness was evaluated based on the change on abdominal muscle contraction count by light beam irradiation to rat L6 and S1 dorsal root ganglia (S. AGOSTINI et al., Neurogastroenterol Motil (2012) 24, 376-e172). A laser beam oscillated by semiconductor was used as the light beam.

Three groups were set to the rats: a normal group without stress (Intact), a pathological model group with stress to induce pathology (Control), and a laser beam irradiation group with stress and percutaneous laser beam irradiation. The subgroups of laser beam irradiation group are named as laser 1, laser 2, and laser 3.

The conditions of light beam will be explained. The light source used was a near-infrared semiconductor laser, and the wavelength used was 808 nm±20 nm (788 nm to 828 nm) due to individual difference of the lasers. The peak power was set to three conditions of 10 W, 0.7 W, and 0.18 W for laser 1, laser 2, and laser 3, respectively. The allowable range was ±20% for each. The beam shape was circular, and the profile showing the spatial power distribution was set to Gaussian distribution. The irradiation radius was a distance from the point of maximum peak power to the point of peak power of maximum peak power×0.135 ($1/e^2$), and the irradiation area was 2.79 $cm^2$. The irradiation mode was pulse irradiation, the pulse width was 20 ms, the pause time was 180 ms, the repetition frequency was 5 Hz, and the pulse duty ratio was 10%. The average power (peak power×pulse duty ratio) is 1 W, 0.07 W, 0.018 W, respectively, for laser 1, laser 2, and laser 3, and the average power density (average power per unit area:average power/irradiation area) is 358 $mW/cm^2$, 25.1 $mW/cm^2$, and 6.45 $mW/cm^2$, respectively. The irradiation time was set to 600 seconds for all groups, and the amount of the light beam in terms of energy (average power×irradiation time) is 600 J, 42.0 J, and 10.8 J, respectively, for laser 1, laser 2, and laser 3, and the energy density (energy per unit area:energy/irradiation area) is 215 $J/cm^2$, 15 $J/cm^2$, and 3.87 $J/cm^2$, respectively. Based on the results described in Examination of light beam transmissiveness by simulation, the peak power, average power, average power density, energy, and energy density in the nonclinical test are each multiplied by 15.3 to give the human equivalent conditions. That is, the laser conditions for the rats in the nonclinical test of laser 1, laser 2, and laser 3 are converted to human equivalent conditions: the peak power as 153 W, 10.7 W, and 2.8 W, the average power as 15.3 W, 1.07 W, and 0.28 W, the average power density as 5484 $mW/cm^2$, 384 $mW/cm^2$, and 99 $mW/cm^2$, the energy as 9180 J, 643 J, and 165 J, and the energy density as 3290 $J/cm^2$, 230 $J/cm^2$, and 59 $J/cm^2$, respectively.

The irradiation positions were the dorsal root ganglion L6 and S1 on both sides, L6 and S1 on one side were set to be simultaneously in the irradiation range, and each side was percutaneously irradiated for 300 seconds, resulting in a total of 600 seconds for both sides. The number of animals was 10 in the normal group and 15 in each of remaining 4 groups. The count of abdominal muscle contractions was measured for 5 minutes as an evaluation item. The evaluation was performed blindly, that is, in a situation where the evaluator did not know which group of animals was being evaluated.

The flow of the experiment will be shown. After grouping the animals so that the average body weights were even, the animals of the pathological model group (Control) and the laser beam irradiation group (lasers 1, 2, 3) were placed in a restraint cage for 1 hour to induce the pathological condition. Concurrently, animals in the normal group (Intact) were placed in cages large enough not to suppress movement. The animals were taken out of the cage, and the animals in the laser beam irradiation group were restrained and irradiated percutaneously with the lasers under the corresponding conditions of laser 1, laser 2, or laser 3. Concurrently, the animals in the normal group (Intact) and the pathological model group (Control) were subjected to restraint and sham irradiation (pressing a non-oscillating irradiation device on the skin). After irradiation or sham irradiation, a barostat balloon catheter was inserted through the anus and fixed with ELASTPORE. After fixation, the animals were individually placed in observation cages and acclimatized for 30 minutes. After the acclimatization was completed, air was injected into the balloon to an internal pressure of 60 mmHg using a manometer, and the extension stimulus was applied for 5 minutes. During the load of 5-minute extension stimulus, a mirror was placed at the lower part of the observation cage to measure the count of abdominal muscle contractions in the animal. Significance test was performed as a comparison test between two groups for the normal group (Intact) and the pathological model group (Control) using Student's t-test. The effectiveness of the laser beam irradiation group (laser 1, laser 2, laser 3) with respect to the pathological model group (Control) was examined by performing a multiple comparison test using Dunnett's test. The significance level was set to 5%, and the case of less than 5% was considered to have a statistically significant difference.

Figure 4:
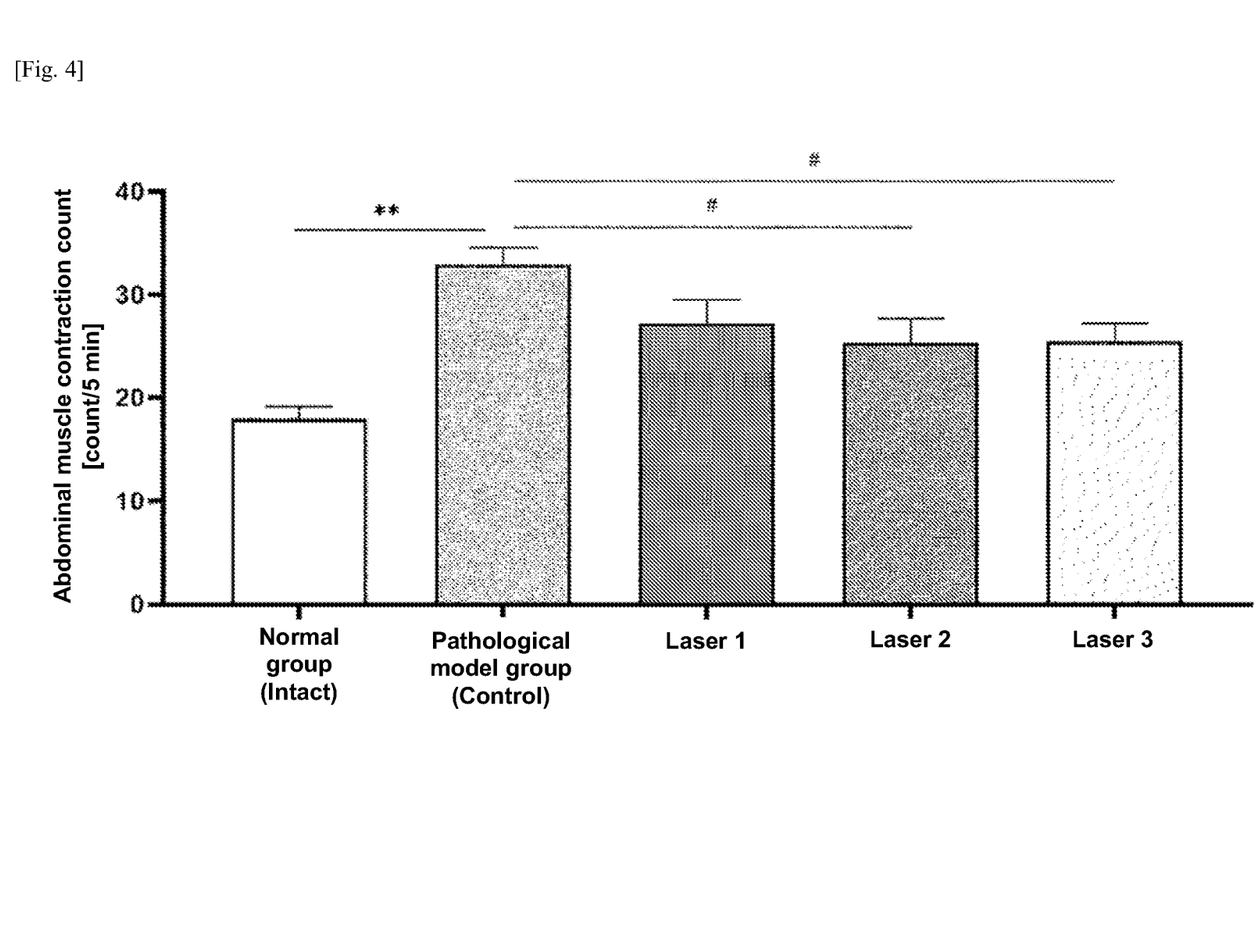
FIG. 4 is a graph showing the therapeutic effect on a rat model of irritable bowel syndrome by light beam irradiation.

The results are shown in FIG. 4. The mean value is shown by bar graph and the standard error is shown by error bar. In addition, ** indicates that the p-value is lower than 0.01 between the groups, and # indicates that the p-value is lower than 0.05 between the groups. The pathological model group (Control) was confirmed to show significant increase in the count of abdominal muscle contractions with respect to the normal group (Intact), and thus induce the pathological condition. Laser 1 of the laser beam irradiation group was confirmed to show tendency of decrease in the count of abdominal muscle contractions with respect to the pathological model group (Control), and the two groups of laser 2 and laser 3 were confirmed to show a significant decrease in the count of abdominal muscle contractions with respect to the pathological model group (Control).

Example 3

Examination of Therapeutic Effect on Irritable Bowel Syndrome Model Rat by Light Beam Irradiation, Part 2

Physical restraint stress model rats, one of the animal models of irritable bowel syndrome, were used and the effectiveness was evaluated for different laser conditions.

Three groups were set to the rats: normal group 2 without stress (Intact 2), pathological model group 2 with stress to induce pathology (Control 2), and laser 4 of the laser beam irradiation group with stress and percutaneous laser beam irradiation.

One condition with the peak power of 4.6 W was set as the condition of light beam of laser 4. The average power (peak power×pulse duty ratio) is 0.46 W, the average power density (average power per unit area:average power/irradiation area) is 165 mW/cm$^2$, the amount of the light beam in terms of energy (average power×irradiation time 600 seconds) is 276 J, and the energy density (energy per unit area:energy/irradiation area) is 99 J/cm$^2$. The allowable range was ±20% for each. The above conditions for the rats in nonclinical test are converted by multiplying by 15.3 to human equivalent conditions: the peak power of 70 W, the average power of 7.0 W, the average power density of 2523 mW/cm$^2$, the energy of 4223 J, and the energy density of 1514 J/cm$^2$. The wavelength was set to 808 nm±20 nm (788 nm to 828 nm).

The number of animals was 10 in the normal group 2 (Intact 2) and 15 in each of the pathological model group 2 (Control 2) and laser 4. Except the above, the procedure was carried out under the same conditions as in Example 2.

Figure 5:
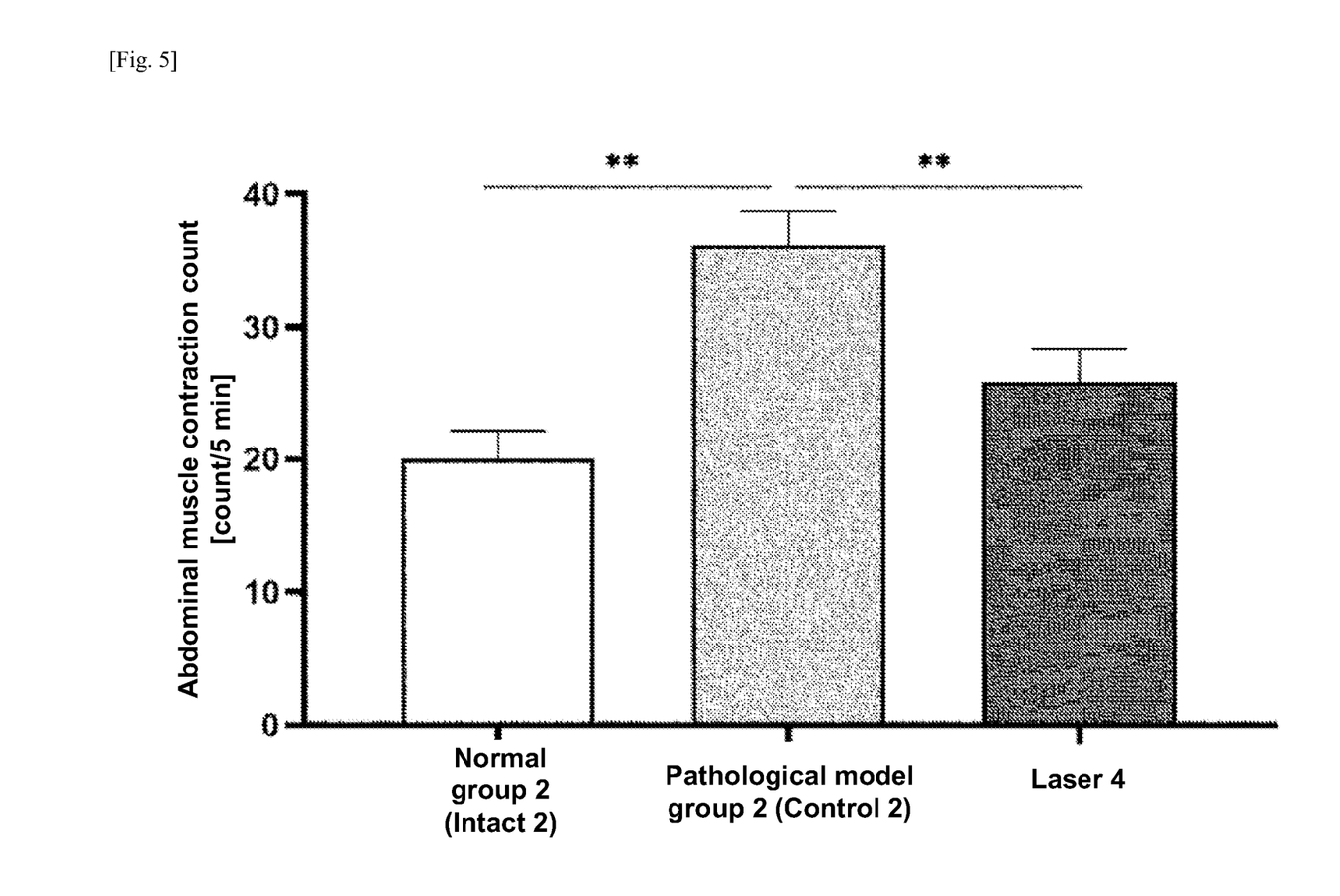
FIG. 5 is another graph showing the therapeutic effect on a rat model of irritable bowel syndrome by light beam irradiation.

The results are shown in FIG. 5. The mean value is shown by bar graph and the standard error is shown by error bar. In addition, ** indicates that the p-value is lower than 0.01 between the groups. The pathological model group 2 (Control 2) was confirmed to show significant increase in the count of abdominal muscle contractions with respect to the normal group 2 (Intact 2), and thus induce the pathological condition. Laser 4 was confirmed to show a significant decrease in the count of abdominal muscle contractions with respect to the pathological model group 2 (Control 2), and thus shown to exhibit a therapeutic effect.

From the above, it was shown that hyperalgesia was suppressed by percutaneously irradiating with laser beam the L6 and S1 dorsal root ganglia in the irritable bowel syndrome model rat. Percutaneous laser beam irradiation of the sacral foramina can be said to be a treatment or prevention method for irritable bowel syndrome.

REFERENCE SIGNS LIST

1. Light beam irradiation device
2. Light beam irradiation probe
3. Light beam source
4. Probe cable
5. Body
6. Light beam source and power supply

The invention claimed is:

1. A method of using a light beam irradiation device for treating or preventing irritable bowel syndrome, the light beam irradiation device comprising a light beam source configured to emit a light beam and a light beam irradiation probe configured to perform irradiation with the light beam, and the method comprising:
   arranging the light beam irradiation probe at a position in which the light beam irradiation probe is facing towards a nerve that is at a sacral foramen; and
   while the light beam irradiation probe is at the position, controlling:
      the light beam source to emit the light beam; and
      the light beam irradiation probe to percutaneously irradiate, with the light beam emitted by the light beam source, the sacral foramen and the nerve.

2. The method according to claim 1, wherein an average power of the light beam of irradiation from the light beam irradiation probe is 200 mW or more.

3. The method according to claim 1, wherein an average power of the light beam of irradiation from the light beam irradiation probe is 200 mW to 19 W.

4. The method according to claim 1, wherein an average power density (average power of light beam of irradiation from the light beam irradiation probe/irradiation area of light beam) is 75 mW/cm² or more.

5. The method according to claim 1, wherein the average power density (average power of light beam of irradiation from the light beam irradiation probe/irradiation area of light beam) is 75 to 6600 mW/cm².

6. The method according to claim 1, wherein an amount of the light beam of irradiation from the light beam irradiation probe in terms of energy is 130 J or more per treatment.

7. The method according to claim 1, wherein the amount of the light beam of irradiation from the light beam irradiation probe in terms of energy is 130 to 11020 J per treatment.

8. The method according to claim 1, wherein an energy density (amount of light beam of irradiation from the light beam irradiation probe in terms of energy/irradiation area of light beam) is 45 J/cm² or more per treatment.

9. The method according to claim 1, wherein the energy density (amount of light beam of irradiation from the light beam irradiation probe in terms of energy/irradiation area of light beam) is 45 to 4000 J/cm² per treatment.

10. The method according to claim 1, wherein a wavelength of the light beam of irradiation from the light beam irradiation probe is 750 to 850 nm.

11. The method according to claim 1, wherein the device integrates the light beam source is integrated into the light beam irradiation probe and is portable.

12. The method according to claim 11, wherein the average power of the light beam of irradiation from the light beam irradiation probe is 200 mW to 19 W.

13. The method according to claim 1, wherein controlling, while the light beam irradiation probe is facing at the position, the light beam source, to emit the light beam, and the light beam irradiation probe, to percutaneously irradiate with the light beam emitted by the light beam source the sacral foramen and the nerve, comprises:
   controlling the light beam irradiation probe, to percutaneously irradiate with the light beam emitted by the light beam source the sacral foramen and the nerve continuously for a duration of 3 to 60 minutes.

14. The method according to claim 1, wherein controlling, while the light beam irradiation probe is facing at the position, the light beam source, to emit the light beam, and the light beam irradiation probe, to percutaneously irradiate with the light beam emitted by the light beam source the sacral foramen and the nerve, comprises:
   controlling the light beam irradiation probe, to percutaneously irradiate with the light beam emitted by the light beam source the sacral foramen and the nerve by any of first intervals and second intervals,
   the first intervals each comprising a 1-minute irradiation with a 10-second pause, and
   the second intervals each comprising a 30-second irradiation with a 5-second pause.

15. The method according to claim 1, wherein the sacral foramen and the nerve are of a human body, and at the position, the light beam irradiation device is directly facing skin that is between the light beam irradiation device and the sacral foramen.

16. The method according to claim 15, wherein the method is performed percutaneously and entirely non-invasively with respect to physical entry of the light beam irradiation device to the human body.

* * * * *